No. 835,031. PATENTED NOV. 6, 1906.
W. D. MYERS.
JOURNAL BOX BEARING FOR ROTARY DISKS OF DRILLS.
APPLICATION FILED JUNE 22, 1905. RENEWED AUG. 7, 1906.
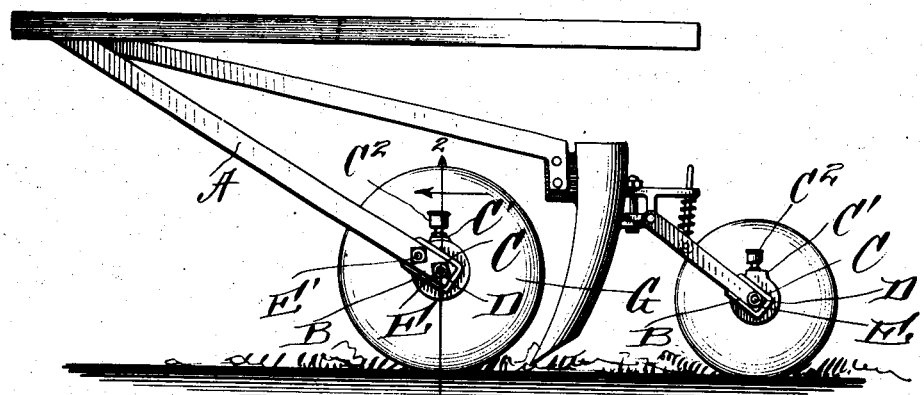
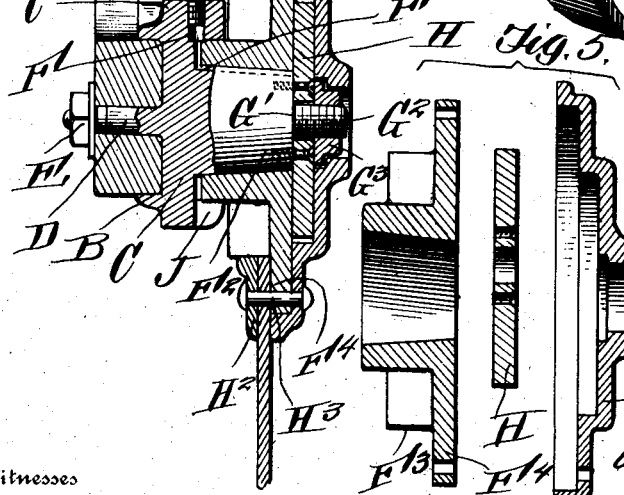
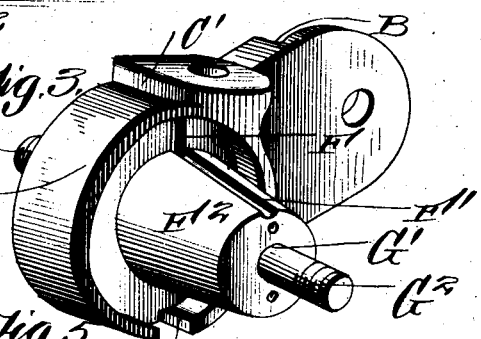
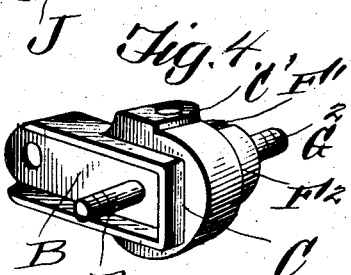
Witnesses
Robt. A. Boswell
Hester E. Drayton
Inventor
Wm. D. Myers,
By Franklin H. Hough
Attorney

UNITED STATES PATENT OFFICE.

WILLIAM D. MYERS, OF WAYNOKA, OKLAHOMA TERRITORY, ASSIGNOR OF ONE-HALF TO W. H. HERMES, OF CANTON, OKLAHOMA TERRITORY.

JOURNAL-BOX BEARING FOR ROTARY DISKS OF DRILLS.

No. 835,031.          Specification of Letters Patent.          Patented Nov. 6, 1906.

Application filed June 22, 1905. Renewed August 7, 1906. Serial No. 329,596.

*To all whom it may concern:*

Be it known that I, WILLIAM D. MYERS, a citizen of the United States, residing at Waynoka, in the county of Woods, Oklahoma Territory, have invented certain new and useful Improvements in Journal-Box Bearings for Rotary Disks of Drills; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to bearings for journal-boxes for rotary disks of drills, and more particularly the invention provides means to prevent dust or other foreign matter from entering the bearing.

More especially the invention provides means consisting of a main body portion having a recess upon one side thereof in which the end of the draw-bar may be bolted or otherwise secured, and on the opposite side of that having the recess is a cylindrical bearing portion which is received by the rotary piece which is riveted or otherwise secured to a cutting rotary disk, and projecting from said bearing portion is a screw-threaded spindle which is adapted to receive a bearing-disk and also a suitable nut to securely hold said bearing-disk upon the spindle.

Furthermore, the invention provides means consisting of a plate, substantially as shown in Fig. 2 of the drawings, to securely hold said bearing-disk in place and at the same time to clamp the cutting rotary disk between said plate and the securing-ring by means of rivets or any other suitable fastening means. The main body portion is also provided with a suitable hard-oil cup to provide suitable lubricating means for the bearing.

The invention consists in various details of construction and in combinations and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a side elevation of a portion of a drill, showing my improved bearing applied to the draw-bar and the cutting rotary disk and also applied to the press-wheels in the rear of the hoe. Fig. 2 is a sectional view on line 2 2 of Fig. 1. Fig. 3 is a perspective view of the main body portion of the bearing looking at the side from which the spindle projects. Fig. 4 is a detail perspective view of the main body portion of the bearing looking at the opposite side, and Fig. 5 is a view of several of the parts shown in Fig. 2 in readiness to be assembled.

Reference now being had to the details of the drawings by letter, A designates a suitable draw-bar of a drill, the end of which is adapted to be received by a recessed portion B in one side of the main body portion C and securely held in place by a screw-threaded spindle D, which projects from the face of the recessed portion B. Said spindle D is adapted to receive a suitable nut E to securely hold said draw-bar in position. To provide further means of securing said draw-bar, a suitable nut and bolt E' are provided, as shown clearly in Fig. 1 of the drawings. Upon the upper cylindrical portion of the main body portion is an offset C', which is adapted to have secured thereto a suitable hard-oil cup $C^2$, as shown clearly in Figs. 1 and 2 of the drawings.

F designates a suitable duct which affords communication between the hard-oil cup and the longitudinal recess F' in the conical surface of the bearing portion $F^2$. This duct is for the purpose of allowing the oil to find its way to the bearing for the purpose of lubricating the same. Adapted to fit over the bearing portion $F^2$ is a rotary piece $F^3$, and to the circumferential flange $F^4$ of said rotary piece is secured the cutting rotary disk G. This rotary disk is securely held in place by means of rivets $H^3$, as shown clearly in Fig. 2 of the drawings. Projecting from the bearing portion $F^2$, as shown at G', is a screw-threaded spindle $G^2$, which is for the purpose of receiving the bearing-disk H, which is clearly shown in Fig. 2 of the drawings. Said spindle is adapted to receive a suitable nut $G^3$ to securely hold the rotary disk in position with relation to the rotary piece $F^3$. Adapted to fit over and to cover the bearing-disk H and the nut $G^3$ is a plate H', having suitable circumferential recesses to conform to the general outline formed by the rotary disk H and the rotary piece F³. This plate H' is also adapted to clamp the cutting rotary disk between said plate, the flange of the rotary portion F³, and a securing-ring H² by means of the rivets H³, as before referred to.

To allow the waste of oil or any suitable lubricating substance which is fed from the hard-oil cup through the duct F to the recess F' to escape after it has done its work, a suitable recess or opening J in the flange of the main body portion of the bearing is provided, as shown clearly in Figs. 2 and 3 of the drawings.

The description of the detailed construction of the above-set-forth invention will be readily understood by reference being had to the accompanying drawings.

Having thus fully described my invention, what I claim as new, and desire to secure by Letters Patent, is—

A dust-proof bearing comprising a member C having a recess in one face thereof, and a lug projecting from the bottom of said recess, a draw-bar seated in said recess and having an aperture adapted to receive said lug, a nut fitted on the threaded end of said lug, said member having a conical bearing-surface projecting from its face opposite said recess, a rotary hub portion provided with a bore with inclined wall mounted upon the conical-shaped bearing-surface of said member, a disk fitted to said rotary hub portion, a threaded lug G² projecting from one end of said member, a shouldered disk fastened to said hub portion, a washer interposed between said shouldered disk and hub portion, and a nut fitted upon said threaded lug G² and engaged by said shouldered disk, as set forth.

In testimony whereof I hereunto affix my signature in the presence of two witnesses.

WILLIAM D. MYERS.

Witnesses:
O. J. HAWKINS,
E. S. OLMSTED.